United States Patent
Mao et al.

(10) Patent No.: US 9,369,221 B2
(45) Date of Patent: Jun. 14, 2016

(54) SIGNAL RECEPTION APPARATUS AND METHOD FOR IMPLEMENTATION THEREOF

(75) Inventors: Jianhua Mao, Guangdong Province (CN); Lei Liu, Guangdong Province (CN); Xiaoming Yu, Guangdong Province (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 697 days.

(21) Appl. No.: 13/383,906

(22) PCT Filed: Apr. 19, 2010

(86) PCT No.: PCT/CN2010/071872
§ 371 (c)(1),
(2), (4) Date: Jan. 13, 2012

(87) PCT Pub. No.: WO2011/006381
PCT Pub. Date: Jan. 20, 2011

(65) Prior Publication Data
US 2012/0157030 A1    Jun. 21, 2012

(30) Foreign Application Priority Data
Jul. 14, 2009 (CN) .......................... 2009 1 0158993

(51) Int. Cl.
*H04B 17/318* (2015.01)
*H04B 17/23* (2015.01)

(52) U.S. Cl.
CPC .............. *H04B 17/318* (2015.01); *H04B 17/23* (2015.01)

(58) Field of Classification Search
CPC ............ H04M 1/725; H04M 1/72502; H04M 1/72527; H04M 2250/08; H04M 1/247; H04M 7/0057; H05B 17/0057; H05B 17/0065; H05B 1/40; H04L 12/2854

USPC ............ 455/414.1, 414.4, 420, 422.1, 426.1, 455/462, 434, 66.1, 465, 74.1; 379/93.01, 379/93.17, 93.09, 102.02, 90.01, 93.15, 286
See application file for complete search history.

(56) References Cited

U.S. PATENT DOCUMENTS

| 6,006,088 | A  | * | 12/1999 | Couse ......................... 455/415 |
| 6,931,120 | B1 | * | 8/2005  | Leshner et al. ........... 379/390.04 |
| 7,389,127 | B2 | * | 6/2008  | Nomiyama et al. ....... 455/562.1 |
| 2003/0032393 | A1 | * | 2/2003 | Kennedy et al. ............. 455/74.1 |
| 2004/0131133 | A1 | * | 7/2004 | Charney et al. .............. 375/334 |

(Continued)

FOREIGN PATENT DOCUMENTS

| CN | 2484713 Y | 4/2002 |
| CN | 1375982 A | 10/2002 |

(Continued)

OTHER PUBLICATIONS

International Search Report dated Jul. 22, 2010 issued in International Application No. PCT/CN2010/071872.

*Primary Examiner* — Sujatha Sharma
(74) *Attorney, Agent, or Firm* — Scully Scott Murphy & Presser

(57) ABSTRACT

The present invention discloses a signal reception apparatus and a method for implementation thereof. The apparatus comprises: a personal computer interface, configured to implement the communications between a personal computer and the signal reception apparatus; an antenna module, configured to receive signals of a base station; and an antenna interface, configured to implement the communications between a terminal and the signal reception apparatus, so as to provide the signals received by the antenna module to the terminal. The present invention improves the signal reception effect of the terminal.

10 Claims, 3 Drawing Sheets

(56) References Cited

U.S. PATENT DOCUMENTS

2007/0135120 A1* 6/2007 King et al. .................. 455/426.2
2007/0223455 A1* 9/2007 Chang et al. .................. 370/352
2009/0270055 A1* 10/2009 Rofougaran .................. 455/120

FOREIGN PATENT DOCUMENTS

| CN | 1553736 A | | 12/2004 |
| CN | 201054731 Y | | 4/2008 |
| CN | 101341710 A | | 1/2009 |
| CN | 101351005 A | | 1/2009 |
| CN | 201234356 Y | | 5/2009 |
| CN | 101605403 A | | 12/2009 |
| GB | 2374253 | * | 10/2002 |
| JP | 06311067 | * | 11/1994 |
| KR | 1650885 | * | 4/2006 |
| WO | WO0143380 | * | 6/2001 |

* cited by examiner

SIGNAL RECEPTION APPARATUS AND METHOD FOR IMPLEMENTATION THEREOF

FIELD OF THE INVENTION

The present invention relates to the communication field, and in particular to a signal reception apparatus and a method for implementation thereof.

BACKGROUND OF THE INVENTION

Currently, a wireless terminal generally achieves surfing the web by a computer, and in a general case it achieves surfing the web by inserting directly into a certain communication interface of the computer and by software in the Personal Computer (PC) side. The characteristics of this surfing mode are: the terminal cannot move the location thereof, and if it is desirable to move the terminal, the computer must be moved together with the terminal, and moreover, when the computer (especially the lap-top computer) works, it will generate the electromagnetic interference on the wireless terminal, and the display screen and the motherboard thereof all have an influence on the radio frequency antenna of the wireless terminal, which have a relatively strong interference and weakening effect on a wireless signal, severely, resulting in that the signals of a base station will not be received by the terminal. The communication rate for surfing by the terminal is affected greatly, so that the customers cannot stand. On the other hand, because the area of the Print Circuit Board (PCB) of the terminal itself is limited, it is determined that the antenna thereof being made into a high-gain antenna is very difficult. The gain of terminal antenna restricts the performance of the terminal receiving signals and transmitting signals in the conventional art.

SUMMARY OF THE INVENTION

The present invention is proposed aiming at the problem that the gain of terminal antenna restricts the performance of the terminal receiving signals and transmitting signals in the conventional art, and for this purpose, the main object of the present invention is to provide a signal reception apparatus and a method for implementation thereof, so as to solve the above problem.

A signal reception apparatus is provided according to one aspect of the present invention.

The signal reception apparatus according to the present invention comprises: a personal computer interface, configured to implement the communications between a personal computer and the signal reception apparatus; an antenna module, configured to receive signals of a base station; and an antenna interface, configured to implement the communications between a terminal and the signal reception apparatus, so as to provide the signals received by the antenna module to the terminal.

Preferably, the above apparatus further comprises: a signal processing module, configured to control the signal strength of the signal reception apparatus according to signal strength data from the personal computer; and a strength indication module, configured to display the signal strength according to the control of the signal processing module.

Preferably, the above apparatus further comprises: an interface conversion module, configured to convert signals from the personal computer interface to signals which can be processed by a terminal interface, to realize the communications between the signal processing module and the personal computer.

Preferably, the above apparatus further comprises: the interface conversion module, also configured to convert the signals of the personal computer interface to the signals which can be processed by the terminal interface under the circumstance that the standard of the personal computer interface is different from the standard of the terminal interface; and to perform the pass-through of the signals of the personal computer interface under the circumstance that the standard of the personal computer interface is identical to the standard of the terminal interface.

Preferably, the above apparatus further comprises: a power supply module, configured to supply the power for the interface conversion module, the signal processing module and the strength indication module.

Preferably, the antenna module is a high-gain antenna.

Preferably, the signal reception apparatus is connected to the terminal by a wire.

Preferably, when the signal reception apparatus is connected to the terminal, the terminal uses the signal reception apparatus to receive signals and stops using the internal antenna of the terminal to receive the signals.

A method for implementing a signal reception apparatus is provided according to another aspect of the present invention.

The method for implementing the signal reception apparatus according to the present invention comprises: connecting the signal reception apparatus to a personal computer; and receiving signals and providing the received signals to a terminal by the signal reception apparatus.

Preferably, the step of receiving the signals by the signal reception apparatus comprises: displaying the signal strength of the signal reception apparatus by the signal reception apparatus according to the signal strength data indicated by the personal computer, wherein if the signal strength meets a predetermined threshold value, the signal reception apparatus will receive by the signals.

Preferably, after the step of displaying the signal strength of the signal reception apparatus by the signal reception apparatus according to the signal strength data indicated by the personal computer, the above method further comprises: adjusting the signal reception apparatus if the signal strength does not meet the predetermined threshold value.

Preferably, the step of displaying the signal strength of the signal reception apparatus by the signal reception apparatus according to the signal strength data indicated by the personal computer comprises: receiving a signal indication from the personal computer by the signal reception apparatus, wherein the signal indication carries with the signal strength data; and displaying the signal strength by the signal reception apparatus according to the signal strength data.

Preferably, the signal reception apparatus is connected to the terminal by a wire.

Preferably, when the signal reception apparatus is connected to the terminal, the terminal uses the signal reception apparatus to receive signals and stops using the internal antenna of the terminal to receive the signals.

By the present invention, it adopts that the location of the apparatus is adjusted or the reception direction of the antenna on the apparatus is adjusted to enhance the signal reception effect of the wireless terminal, solving the problem that the gain of terminal antenna restricts the performance of the terminal receiving signals and transmitting signals in the conventional art, thereby improving the signal reception effect of the terminal.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

Functional Overview

The embodiments of the present invention provide a signal reception apparatus on a wireless terminal and a method for implementation thereof, and in particular, extend the signal reception effect of the wireless terminal surfing the web with a computer by using the signal reception apparatus of the embodiment of the present invention according to the method of the embodiment of the present invention, which means enhancing the signal reception effect of the wireless terminal by adjusting the location of the apparatus or adjusting the reception direction of an antenna on the apparatus. The technical solution provided by the embodiments of the present invention is independent of particular communication systems, and is applicable to wireless terminals.

It needs to be noted that the embodiments and the features of the embodiments in the present application can be combined with each other under the circumstances that there is no conflict. The present invention is described in detail with reference to the accompanying drawings and in combination with the embodiments hereinafter.

Apparatus Embodiment

A signal reception apparatus is provided according to the embodiment of the present invention. The apparatus comprises: a terminal interface (namely, a PC interface) 2, an antenna module 1 and an antenna interface 3, the structure of which will be described hereinafter.

The PC interface 2 is configured to implement the communications between a PC and the signal reception apparatus; the antenna module 1 is configured to receive signals from a base station; and the antenna interface 3 is configured to implement the communications between a terminal and the signal reception apparatus, so as to provide the signals received by the antenna module to the terminal.

Figure 1:
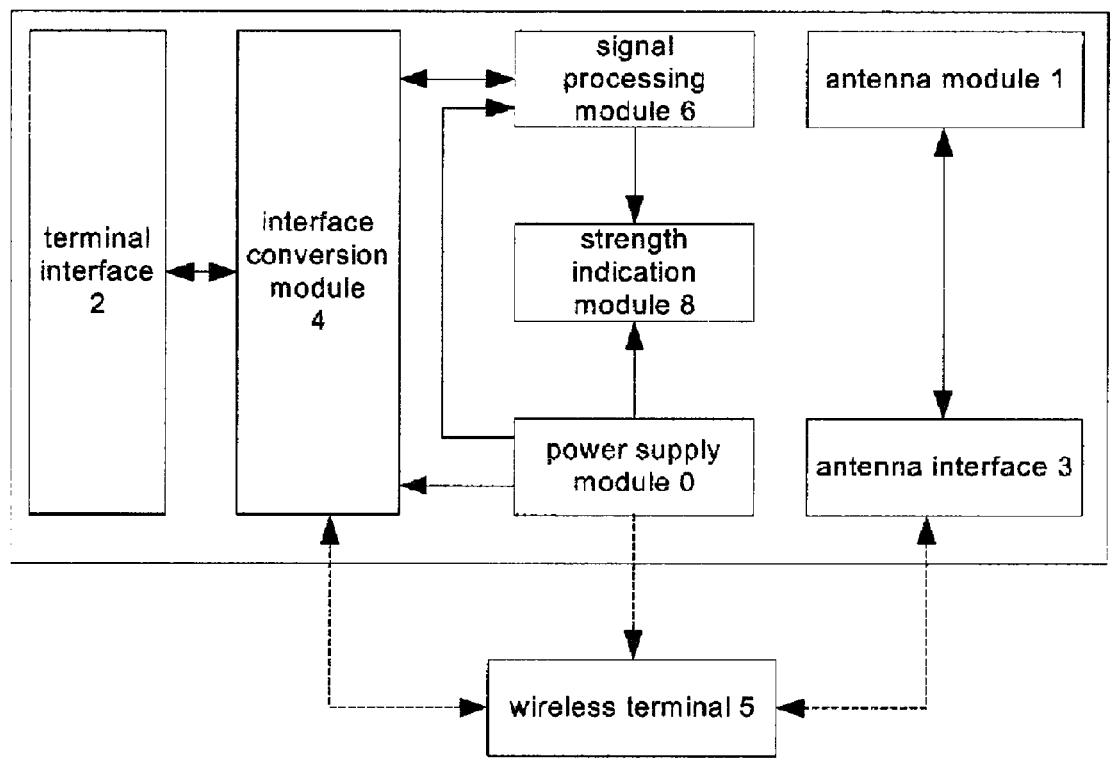
FIG. 1 is a structural block diagram of a signal reception apparatus according to an embodiment of the present invention.

FIG. 1 is a preferred structural block diagram of the signal reception apparatus according to the embodiment of the present invention. As shown in FIG. 1, preferably, the hardware apparatus may further comprise the following modules: an interface conversion module 4, a signal processing module 6, a strength indication module 8, a power supply module 0, an antenna module 1 and an antenna interface 3. All structures of the apparatus will be described in detail hereinafter.

The terminal interface 2 is mainly an interface used for communications between the PC and the apparatus. The terminal interface 2 is mainly connected to the PC interface, wherein the terminal interface and the PC interface may be connected with each other by a communication cable or an interface wire having a certain length, the purpose of which is to enable the PC to communicate with the apparatus. In addition, a wireless mode can also be adopted to guarantee the communications between the PC and the apparatus.

The interface conversion module 4, mainly composed of interface conversion chips, is configured to convert signals from the PC interface to signals which can be processed by the terminal interface so as to realize the communications between the signal processing module and the PC. That is to say, the PC side interface is converted to an interface needed by a wireless terminal 5, or performs directly the pass-through process. In particular, if the standard of the PC interface is different from the standard of the wireless terminal interface or the requirements of the PC interface and the wireless terminal interface are different, the PC interface is converted to the interface needed by the wireless terminal, namely, the signals of the PC interface will be converted to the signals which can be processed by the terminal interface, otherwise the signals of the PC side interface will be performed directly pass-through. In addition, the interface conversion module 4 also provides an interface for the communications between the signal processing module 6 and the PC, and in this way the wireless terminal and the signal processing module 6 both can realize the communications with the PC by this interface conversion module 4. It becomes possible that the terminals with various interfaces enable using the apparatus due to the existence of the interface conversion module.

The signal processing module 6, mainly composed of a processor, is configured to control the signal strength of the signal reception apparatus according to signal strength data from the PC, and communicate with the PC according to the protocol agreed by it. After the communication link between the PC and the signal processing module 6 is established, the PC will send the data which is sent by the terminal and is used to indicate the signal strength to the signal processing module 6, and the signal processing module 6 will perform the judgment according to the data and control respectively the different number of indicator lights according to the different threshold value conditions to indicate the received signal strength at the moment. Then at the moment, the user will determine whether to adjust the location of the apparatus or adjust the reception direction of the antenna on the apparatus according to the intensity of the indicator lights.

The strength indication module 8 is configured to display the signal strength according to the control of the signal processing module; i.e., it is mainly controlled by the signal processing module 6 to realize the purpose of indicating the strong signals or the weak signals by turning on or turning off different number of lights at the same time. In particular, the strength indication module 8 is mainly composed of a set of light-emitting diodes, current-limiting resistors and light guiding structures and realizes the purpose of indicating the strong signals or the weak signals by turning on or turning off different number of lights at the same time according to the control by the signal processing module 6. When the signals are relatively strong, at this time there are several turned on lights at the same time, then the user will see the strong light, and when the signals are relatively weak, at this time there are few lights being turned on, then the user will see the weak light.

The power supply module 0 is configured to supply the power for the interface conversion module 4, the signal processing module 6 and the strength indication module 8. The power supply module 0 is mainly composed of an external power supply interface and power supply conversion chips. An external power supply supplies the power to the interface conversion module 4, the signal processing module 6 and the strength indication module 8 by the power supply module 0.

The antenna module 1 is an important component of the apparatus related by the present invention, and it is composed of a single antenna or a set of antennae. Namely, it is composed of one or a set of metal interface(s), and the function thereof is to substitute the antenna of the terminal, so as to better help the terminal to receive the signals of the base station. The function of the antenna interface 3 is that: when the wireless terminal is mounted on the apparatus of the present invention, the transceiver of the terminal will disconnect from the antenna carried by the terminal and connect to the apparatus related by the present invention, then adopt a high-gain antenna on the apparatus as the transceiver antenna to communicate with the base station. At this time, the terminal and the antenna on the apparatus constitute an integral function body. When the user considers that the signals are better and do not want to use the apparatus, he can remove the wireless terminal from the apparatus. And the transceiver of the wireless terminal will connect to the antenna carried by the terminal once again to become an integral function body. In FIG. 1, one end of the wireless terminal is connected to the interface conversion unit by a certain interface, and the radio frequency part which is on the other end of the wireless terminal is connected to the antenna on the apparatus by the antenna interface.

In this case, the signal reception apparatus can be connected to the terminal by a wire. By this way, when the signal strength received by the signal reception apparatus is relatively weak, the received signal strength can be adjusted by moving the signal reception apparatus.

It needs to be noted that: when the signal reception apparatus is connected to the terminal, the terminal may use the signal reception apparatus to receive signals and stop using the internal antenna of the terminal to receive the signals; the terminal will cancel the connection to the signal reception apparatus when the terminal needs to use the internal antenna to receive the signals.

By the embodiment, under the circumstance that the integrity of the wireless terminal does not be damaged, the user may select to insert the wireless terminal directly into the computer to use or use the apparatus designed by the present invention to achieve the surfing function according to the actual situation of the network signal. The antenna on the apparatus may be tailored according to the characteristic of the terminal with various systems and various requirements, so as to achieve the optimum reception effect, which has very strong flexibility and universal applicability.

Method Embodiments

A method for implementing a signal reception apparatus is provided according to the embodiment of the present invention. The method is used to implement the above signal reception apparatus. The method comprises: connecting the signal reception apparatus to a PC; and receiving signals and providing the received signals to a terminal by the signal reception apparatus.

In particular, after the signal reception apparatus displays the signal strength, if the signal strength meets a predetermined threshold value, the signal reception apparatus will receive the signals, and if the signal strength does not meet the predetermined threshold value, the signal reception apparatus will be adjusted.

In particular, before the signal reception apparatus displays the signal strength, the signal reception apparatus has received a signal indication carrying signal strength data from the PC.

In this case, the signal reception apparatus can be connected to the terminal by a wire. By this way, when the signal strength received by the signal reception apparatus is weaker, the received signal strength can be adjusted by moving the signal reception apparatus.

It needs to be noted that: when the signal reception apparatus is connected to the terminal, the terminal may use the signal reception apparatus to receive signals and stop using the internal antenna of the terminal to receive the signals; the terminal will cancel the connection to the signal reception apparatus when the terminal needs to use the internal antenna to receive the signals.

With the embodiment, the influence of the computer on the reception performance of the wireless terminal will be reduced as much as possible when the wireless terminal is in the use, and the performance of the terminal radio frequency transceiver is enhanced greatly by way of the high-gain antenna on the apparatus; thus, it becomes impossible that the wireless terminal can be used in the weak signals resulting from the computer interference.

The particular implementation of one of feasible solutions corresponding to the above apparatus will be introduced in conjunction with the technical solution hereinafter.

Figure 2:
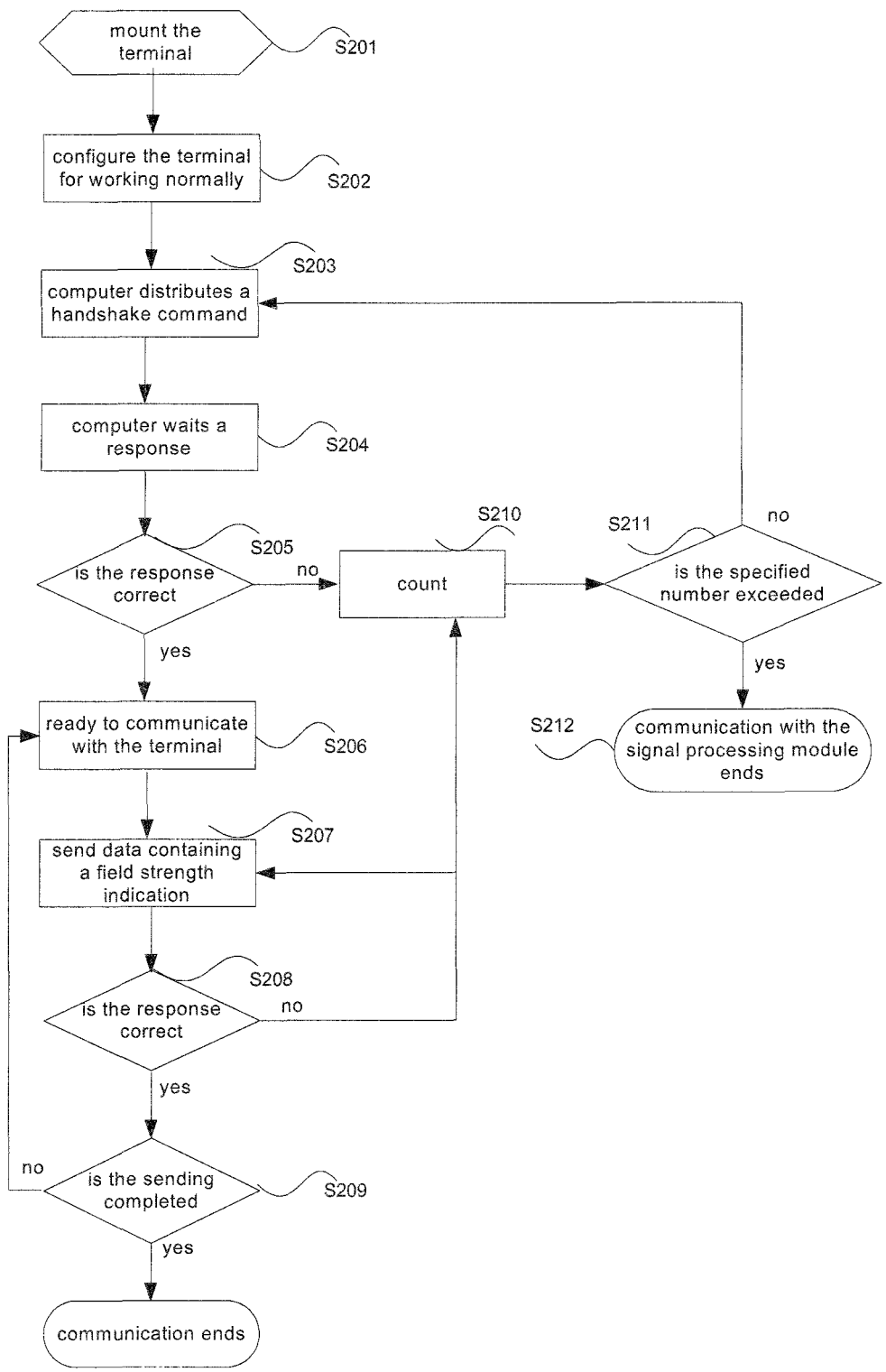
FIG. 2 is a work flowchart of an implementation method for a signal reception apparatus in PC side according to an embodiment of the present invention.

FIG. 2 is a work flowchart of an implementation method for a signal reception apparatus in PC side according to the embodiment of the present invention. As shown in FIG. 2, the processing in the PC side comprises the following steps from the step S201 to the step S212.

Step S201, a terminal is mounted. Namely, the wireless terminal is mounted on the apparatus designed by the present invention. When the user wants to achieve surfing the web by the apparatus, first of all, the wireless terminal needs to be mounted on the apparatus described by the present invention, which can on the one hand connect the wireless terminal to the interface conversion module of the apparatus, so as to ensure that the physical link of the data communications is smooth. In addition, the radio frequency interface of the wireless terminal can be also connected to the antenna by the antenna interface on the apparatus, so as to ensure that the radio frequency link is smooth. When the terminal is connected to the antenna interface of the apparatus, the antenna carried by the terminal will disconnect the physical path with the terminal transceiver. Then the transceiver will connect to the antenna on the apparatus at this time and the antenna on the apparatus will substitute the antenna carried by the terminal to complete the receiving and sending tasks of the signals, thereby playing a role of the apparatus. Furthermore, considering that the requirements of the interfaces with various standards for supplying the power are not exactly the same, a power supply interface is set on the apparatus, and a power adapter supplies the power to the entire apparatus (including the wireless terminal) by the power supply interface. Of course, if some interfaces can supply the power by themselves and the power provided by the computer interface can meet the work requirements of the terminal and the other active circuits of the entire apparatus, the action of connecting the external power supply can be omitted.

Step S202, the wireless terminal is configured for working normally. After the wireless terminal is connected to the apparatus and the powering has been normal, the PC side first of all should configure the operating state of the wireless terminal, including the installation of the driver and the setting of the various necessary parameters. The normal operating state of the terminal also comprises: once the terminal has found the network, the terminal will continuously collect the signal strength of the network according to a certain time and algorithms, convert the signal strength to a digital quantity and report the digital quantity to the computer. It can provide the basis for the subsequent strength indication.

Step S203, the PC (computer) distributes a handshake command. Namely, the PC distributes the handshake command to the signal processing module to establish a communication link. The PC will distribute the handshake command to the signal processing module in the apparatus, so as to lay the foundation for subsequent normal data communications. The distributed command is one or a set of special data according to the agreement by the protocol. The signal processing module will perform the comparison after receiving the PC side data, wherein if the data is correct, the signal processing module will also reply one or a set of special data to the PC, so as to indicate that the user intend to use the apparatus to achieve surfing the web at this time.

Step S204, the computer waits the response.

Step S205, the computer judges whether the response is correct, wherein if the judgment result is yes, the Step S206 will be carried out, and if the judgment result is no, the Step S210 will be carried out.

Step S206, the PC is ready to communicate with the terminal.

Step S207, after the signal processing module correctly answers the handshake signal, the PC starts to send data containing the field strength indication to the signal processing module on the apparatus. Namely, after the signal processing module is communicated normally with the PC, the PC is ready to send the data to the signal processing module. And at this time, the PC will form the signal strength indication data reported by the wireless terminal into frames according to an agreed format, and then send the frames to the signal processing module. The sending process will not end until the sending of the signal strength data is completed.

Step S208, the PC judges whether the response of the signal processing module is correct, wherein if the judgment result is yes, the Step S209 will be carried out, and if the judgment result is no, the Step S210 will be carried out.

Step S209, the PC judges whether the sending is completed, wherein if the judgment result is yes, this communication will end, and if the judgment result is no, it will be returned to the Step S206.

Step S210, the PC starts to count, which can be achieved by a counter.

Step S211, it is judged whether the specified number is exceeded, wherein if the judgment result is yes, the Step S212 will be carried out, and if the judgment result is no, it will be returned to the Step S203.

Step S212, the communication with the signal processing module ends.

That is to say, the PC has not received the response from the signal processing module in a specified time and in a specified number of times, or the data of the received response is abnormal, at this time which indicates that the user is not using the apparatus to surf the web at all or the apparatus is working abnormally. At this time, the PC side will not try to communicate with the signal processing module any more, and the PC side will consider that the user is surfing the web by inserting directly the card into the PC and it is independent of the apparatus.

Figure 3:
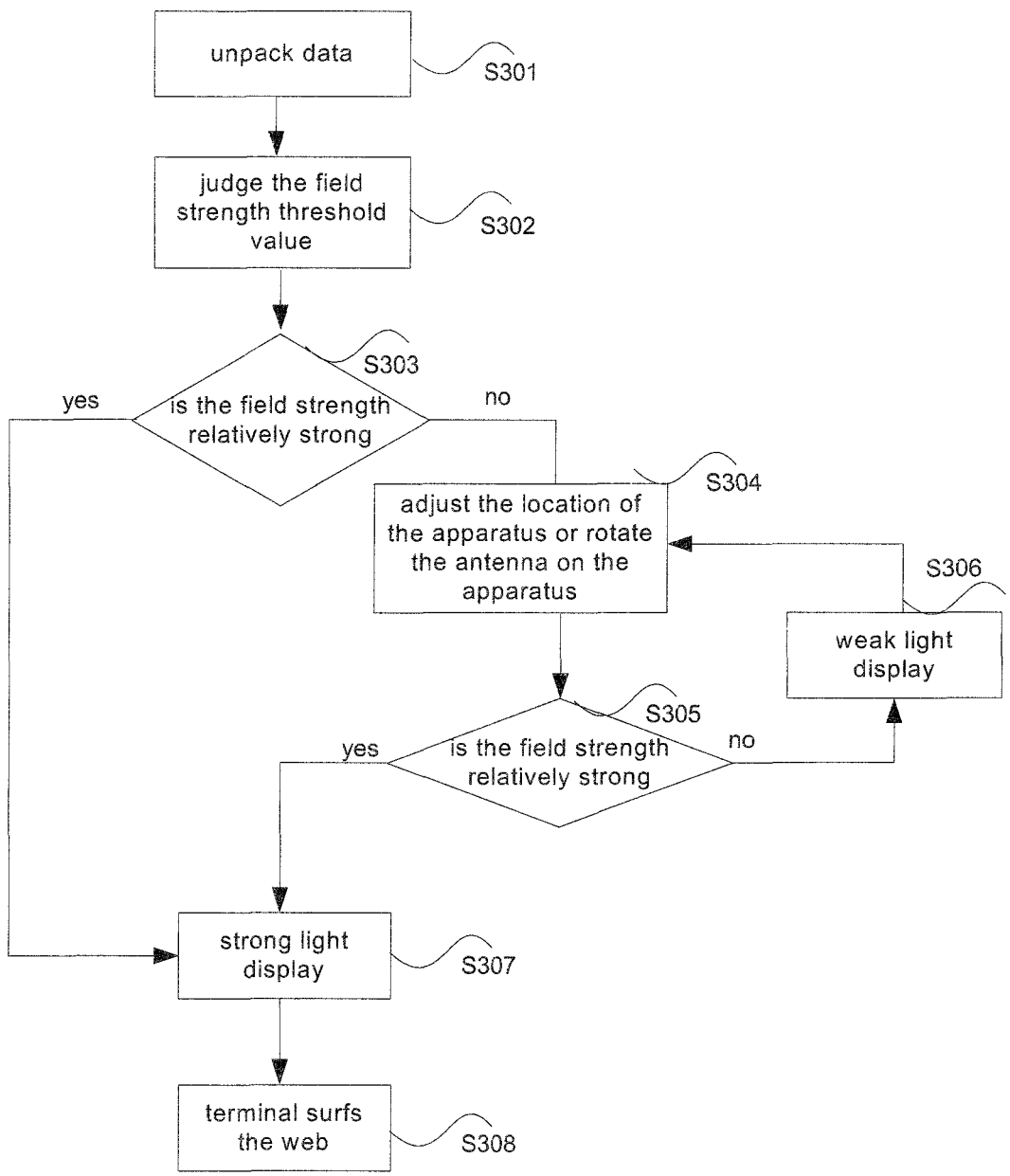
FIG. 3 is a work flowchart of a signal reception apparatus according to an embodiment of the present invention.

FIG. 3 is a work flowchart of a signal reception apparatus according to the embodiment of the present invention. As shown in FIG. 3, the processing of the signal processing module in the signal reception apparatus comprises the following steps from the Step S301 to the Step S308.

Step S301, the signal processing module performs the data unpacking, namely, the signal processing module receives the data containing the signal strength and performs the corresponding process. The signal processing module unpacks to extract the strength data according to the agreed format after receiving the data which contains the signal strength and is sent by the PC side.

Step S302, the received strength data is judged according to the definition about the signal strength in the communication protocol. Namely, the field strength threshold value is judged.

Step S303, it is judged whether the field strength is relatively strong, wherein if the judgment result is yes, the Step S307 will be carried out, and if the judgment result is no, the Step S304 will be carried out. Namely, it is judged whether the signal belongs to the strong signal or the weak signal. At the same time, a set of or one indicator light(s) is controlled in a lighting state according to different signal strength, and the strength indication module will display the strength of the network signal by way of the number of the lighting lattice in a light guiding column.

Step S304, the location of the apparatus is adjusted or the antenna on the apparatus is rotated.

Step S305, after adjusting, it is judged whether the field strength is relatively strong, wherein if the judgment result is yes, the Step S307 will be carried out, and if the judgment result is no, the Step S306 will be carried out.

Step S306, it is the weak light display at this time.

Step S307, it is the strong light display at this time.

The operation from the Step S303 to the Step S307 can be understood as: the user determines whether to adjust the location of the apparatus or to adjust the reception direction of the antenna on the apparatus according to the strength indication result. The user can judge easily that the network signal in this location is a strong signal or a weak signal according to the number of lattice in the lighting state on the apparatus; if the number of the lighting lattice is very small at this time, the user will adjust the apparatus or rotate the antenna on the apparatus to change the reception direction of the antenna; during the adjusting process, the antenna on the apparatus will receive network signals with different strength, and the field strength data will be updated at this time; and then the signal processing module will perform the process again, and the user re-judges the strength of the signal according to the strength of the indicator lights. This process will be carried out continuously till a strong signal is found.

Step S308, surf the web. After the user has found a strong signal location which means that the signal is better at the moment and the terminal can surf the web. At the moment, the data communication is achieved by way of the antenna on the apparatus of the present invention.

In summary, by the above embodiments of the present invention, a signal reception apparatus of a wireless terminal and a method for implementation thereof are provided to better solve the problem of the signal reception, which reduces the influence of the computer on the reception antenna on the wireless terminal by moving the apparatus, enhances the reception effect of the terminal by utilizing sufficiently the high-gain antenna on the apparatus and makes the wireless terminal obtain a better antenna reception effect by moving the apparatus or adjusting the reception direction of the antenna on the apparatus but not by performing the automatic switch between the internal antenna and the external antenna of the terminal; it makes the wireless terminal's user get rid of the constraint of surfing through the PC interface directly. Due to using the apparatus, it makes the wireless terminal and the PC separated a certain distance, thereby reducing as much as possible the influence of the PC on the antenna reception performance, and the performance of the terminal transceiver can be exerted greatly by way of the high-gain antenna on the apparatus, thereby accelerating the searching network time and reducing the searching network power consumption. In addition, when using the apparatus, it will not produce any physical damage effect on the terminal, and the user completely can select to surf according to their own predilections and the strength of the network signal whether by using the apparatus or by connecting directly to the PC interface. Because the apparatus is unrelated to the system of the terminal, therefore, the apparatus and the method of the present invention have a universal applicability.

Obviously, those skilled in the art shall understand that the above modules and steps of the present invention can be realized by using general purpose calculating device, which can be integrated in one calculating device or distributed on a network which consists of a plurality of calculating devices. Alternatively, they can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall cover any modification, equivalent substitution and improvement within the spirit and principle of the present invention.

What is claimed is:

1. A signal reception apparatus, comprising:
 a personal computer interface, configured to implement the communications between a personal computer and the signal reception apparatus;
 an antenna module, configured to receive a signal of a base station, wherein the antenna module is a high-gain antenna; and
 an antenna interface, configured to implement the communications between a terminal and the signal reception apparatus, so as to provide the signal received by the antenna module to the terminal,
 wherein when the signal reception apparatus is connected to the terminal, the terminal uses the signal reception apparatus to receive signals and stops using an internal antenna of the terminal to receive the signals; and
 wherein the location of the signal reception apparatus is adjusted, when the signal strength does not meet a predetermined threshold value,
 wherein the signal reception apparatus is connected to the terminal by a wire.

2. The apparatus according to claim 1, further comprising:
 a signal processing module, configured to control the signal strength of the signal reception apparatus according to signal strength data from the personal computer; and
 a strength indication module, configured to display the signal strength according to the control of the signal processing module.

3. The apparatus according to claim 2, wherein when the signal reception apparatus is connected to the terminal, the terminal uses the signal reception apparatus to receive signals and stops using the internal antenna of the terminal to receive the signals.

4. The apparatus according to claim 2, further comprising:
 an interface conversion module, configured to convert a signal from the personal computer interface to a signal which can be processed by a terminal interface, and to realize the communications between the signal processing module and the personal computer.

5. The apparatus according to claim 4, further comprising:
 the interface conversion module, also configured to convert the signal of the personal computer interface to the signal Which can be processed by the terminal interface under the circumstance that the standard of the personal computer interface is different from the standard of the terminal interface; and to perform the pass-through of the signal of the personal computer interface under the circumstance that the standard of the personal computer interface is identical to the standard of the terminal interface.

6. The apparatus according to claim 4, further comprising:
 a power supply module, configured to supply power for the interface conversion module, the signal processing module and the strength indication module.

7. The apparatus according to claim 4, wherein when the signal reception apparatus is connected to the terminal, the terminal uses the signal reception apparatus to receive signals and stops using the internal antenna of the terminal to receive the signals.

8. A method for implementing a signal reception apparatus, comprising:
 connecting the signal reception apparatus to a personal computer;
 receiving a signal through the signal reception apparatus and providing the received signal to a terminal,
 wherein when the signal reception apparatus is connected to the terminal, the terminal uses the signal reception apparatus to receive signals and stops using an internal antenna of the terminal to receive the signals; and
 adjusting the location of the apparatus, when the signal strength of the signal reception apparatus does not meet a predetermined threshold value,
 wherein the signal reception apparatus has a high-gain antenna, and the signal reception apparatus is connected to the terminal by a wire.

9. The method according to claim 8, wherein the step of receiving the signals by the signal reception apparatus comprises:
 displaying the signal strength of the signal reception apparatus by the signal reception apparatus according to the signal strength data indicated by the personal computer, wherein if the signal strength meets the predetermined threshold value, the signal reception apparatus will receive the signal.

10. The method according to claim 9, wherein before the step of displaying the signal strength by the signal reception apparatus, the method further comprises:
 receiving a signal indication from the personal computer by the signal reception apparatus, wherein the signal indication carries the signal strength data.

* * * * *